US012013280B2

(12) United States Patent
Von Muenster

(10) Patent No.: US 12,013,280 B2
(45) Date of Patent: *Jun. 18, 2024

(54) MATERIAL WEIGHT MEASUREMENT SYSTEM WITH AUTOMATIC TARE ASSOCIATED WITH OBJECT PRESENCE DETECTION

(71) Applicant: Scale Tec, Ltd., Anamosa, IA (US)

(72) Inventor: Nicholas Von Muenster, Anamosa, IA (US)

(73) Assignee: Scale Tec, Ltd., Anamosa, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/078,252

(22) Filed: Dec. 9, 2022

(65) Prior Publication Data

US 2023/0108200 A1 Apr. 6, 2023

Related U.S. Application Data

(63) Continuation of application No. 17/200,165, filed on Mar. 12, 2021, now Pat. No. 11,650,093.

(60) Provisional application No. 63/139,153, filed on Jan. 19, 2021.

(51) Int. Cl.
| | | |
|---|---|---|
| *G01G 15/00* | (2006.01) | |
| *A01K 5/02* | (2006.01) | |
| *G01G 13/16* | (2006.01) | |
| *G01G 19/12* | (2006.01) | |
| *G01G 23/01* | (2006.01) | |

(52) U.S. Cl.
CPC ......... *G01G 15/006* (2013.01); *A01K 5/0283* (2013.01); *G01G 13/16* (2013.01); *G01G 2015/008* (2013.01); *G01G 19/12* (2013.01)

(58) Field of Classification Search
CPC ...... G01G 15/006; G01G 13/16; G01G 19/12; G01G 11/003; G01G 11/04; G01G 13/02; G01G 19/086; G01G 23/01; A01K 5/0283; A01D 41/1272; A01D 41/1273
See application file for complete search history.

(56) References Cited

U.S. PATENT DOCUMENTS

| | | |
|---|---|---|
| 6,349,889 B1 | 2/2002 | Sandolo |
| 6,572,257 B2 | 6/2003 | Bump |
| 7,211,745 B1 | 5/2007 | Brown |
| 8,060,283 B2 | 11/2011 | Mott |
| 8,097,820 B2 | 1/2012 | Klubertanz |
| 8,145,393 B2 | 3/2012 | Foster |

(Continued)

FOREIGN PATENT DOCUMENTS

WO 2014200578 12/2014

OTHER PUBLICATIONS

Guo, L.S., Zhang, Quanyi and Han, Shuxia, Agricultural Machinery Safety Alert System Using Ultrasonic Sensors, Journal of Agricultural Safety and Health, Dec. 2002.

*Primary Examiner* — Randy W Gibson
(74) *Attorney, Agent, or Firm* — SHUTTLEWORTH & INGERSOLL, PLC; Jason R. Sytsma

(57) ABSTRACT

A presence sensor combined to a first storage carrier for detecting a presence of a second storage carrier. A load cell measures the weight of the material expelled from the first storage carrier. A scale controller in communication with the presence sensor responds to the presence of the second storage carrier by recording of the weight measurement from the load cell.

20 Claims, 11 Drawing Sheets

(56) References Cited

U.S. PATENT DOCUMENTS

| | | |
|---|---|---|
| 9,529,364 B2 | 12/2016 | Foster |
| 9,668,411 B1 | 6/2017 | Koch |
| 9,545,048 B2 | 7/2017 | Pickett |
| 9,983,048 B1 | 5/2018 | Meier |
| 10,485,177 B2 | 11/2019 | Bump |
| 10,520,351 B2 | 12/2019 | Johansen |
| 10,677,637 B1 | 6/2020 | Von Muenster |
| 2011/0220677 A1 | 9/2011 | Bertolani |
| 2012/0099948 A1 | 4/2012 | Bump |
| 2014/0196919 A1 | 7/2014 | Kowalchuk |
| 2014/0208851 A1 | 7/2014 | Bischoff |
| 2014/0284118 A1 | 9/2014 | Van Mill |
| 2016/0029559 A1 | 2/2016 | Inoue |
| 2016/0055688 A1 | 2/2016 | Miura |
| 2016/0226977 A1 | 8/2016 | Fujiwara |
| 2016/0339405 A1 | 11/2016 | Bump |
| 2016/0343231 A1 | 11/2016 | Bump |
| 2017/0370765 A1 | 12/2017 | Meier |
| 2018/0022559 A1 | 1/2018 | Knutson |
| 2018/0106709 A1 | 4/2018 | Cherney |
| 2019/0308806 A1 | 10/2019 | Gathman |
| 2019/0345018 A1 | 11/2019 | Garcia |
| 2020/0352099 A1 | 11/2020 | Meier |
| 2022/0228906 A1* | 7/2022 | Von Muenster ....... G01G 23/14 |

\* cited by examiner

MATERIAL WEIGHT MEASUREMENT SYSTEM WITH AUTOMATIC TARE ASSOCIATED WITH OBJECT PRESENCE DETECTION

CROSS-REFERENCE TO RELATED APPLICATIONS

This application is a continuation of U.S. application Ser. No. 17/200,165, filed Mar. 12, 2021, which claims benefit of U.S. Provisional Patent Application No. 63/139,153 filed Jan. 19, 2021, which is incorporated herein by reference.

TECHNICAL FIELD

The present disclosure relates to material movement tracking, and, more specifically, this disclosure relates to the weighing and tracking the movement of agricultural commodities through a series of machines from the harvester to the elevator.

BACKGROUND

Today, with the fast pace of agriculture operations, traceability, operator error, accuracy of technology, and most importantly safety are all considerations during a successful farming operation. With an increased focus on ensuring that farming equipment is operated safely, yet efficiently, precision agriculture technology needs to ensure that it accomplishes both of these tasks simultaneously, as to add to the human factor element of an operator of equipment, focused at the task at hand.

One element of the problem involves accurately recording unloading of a mobile storage carrier, commonly referred to as a grain cart, by the operator of the mobile storage carrier. Commonly, this involves the operator manually pressing a button on a scale controller to initiate a record event and pressing the button again at the end of the unloading operation on the scale controller to end the record event and create a complete unload record. This is increasingly error prone given the fast pace of the farming operation.

The operator is responsible for ensuring the safety of surrounding people and equipment while keeping track of the material. The operator must ensure the grain cart is positioned properly to allow for an accurate measurement of weight. He must also ensure that the grain cart does not collide with the receiving truck or trailer and carefully unfold and position the auger without damaging any equipment. Afterward, the operator must initiate the drive mechanism to power the auger, and keep an eye out to ensure that the material inside the grain cart does not spill over the top of the truck or trailer. All of these tasks can easily lead to errors or, at worst, injury to others or to the expensive equipment.

Along with all of these tasks, the grain cart operator must remember to write down the truck or trailer it unloaded into, the date and time of the unload event, and the field from which it originated. Commonly, operators attempt to log this information in a written log prior to, during, or after the unloading of the grain cart into a truck or trailer, which presents another consideration of task saturation, causing the operator to fail to cross check their environment, narrowing their focus on what is happening around the grain cart, such as people approaching or equipment approaching the rear of the grain cart, for which is blocked from the line of site from the operator.

The human factor demand is considerable to the task saturation within a three to five minute operating window of unloading. The element of unloading involves at least twelve steps of operation that are very dynamic to the effect of ensuring accuracy, and most importantly safety of the unloading operation of a grain cart.

Therefore an improved system is needed and disclosed to accomplish the safety of operation of the mobile storage container, commonly known as a grain cart, as well as ensuring that the task saturation of the operator is reduced by the addition of automation of some but not all the processes required of the operator.

SUMMARY

Disclosed is a system for measuring a weight of material that is transferred from a first storage carrier to a second storage carrier. The system comprises of a presence sensor combined to the first storage carrier for detecting a presence of the second storage carrier. A load cell measures the weight of the material expelled from the first storage carrier. A scale controller in communication with the presence sensor responds to the presence of the second storage carrier by recording of the weight measurement from the load cell.

The scale controller can comprise of a gross weight memory buffer for storing at predetermined intervals a weight measured by the load cell. The presence sensor detects the presence of the second storage carrier proximate to the first storage carrier and, in response to the detection of the presence of the second storage carrier, the scale controller determines a starting weight by averaging the weight measured by the load cell stored in the gross weight memory buffer for a period of time before and another period of time after the detection of the presence of the second storage carrier.

The presence sensor can provide a binary signal to the scale controller corresponding to the presence and absence of the second storage carrier. Upon receipt of the binary signal corresponding to the presence of the second storage carrier the scale controller enters a tare mode to begin measuring with the load cell the weight of material expelled from the first storage carrier and stays in the tare mode until the scale controller receives from the presence sensor the binary signal corresponding to the absence of the second storage carrier. The scale controller can determine an ending weight in response to the absence of the second storage carrier detected by the presence sensor. The ending weight can be determined by averaging the weight measured by the load cell stored in the gross weight memory buffer for a period of time before and another period of time after the absence of the second storage carrier is detected by the presence sensor.

A tare weight record is determined from subtracting the starting weight from the ending weight. The tare weight record can be compared to a predetermined set point. If the tare weight record is less than the predetermined set point the tare weight record is omitted. On the other hand, if the tare weight record is greater than the predetermined set point the tare weight record is saved and displayed on the scale controller.

In some embodiments, the scale controller is in communication with the presence sensor so that the scale controller receives from the presence sensor a presence signal representative of the presence of an object. In response to the presence of the object, the scale controller can determine a beginning weight of the material. When the scale controller receives from the presence sensor a second signal representative of the absence of the object, the scale controller can record an ending weight of the material.

In an embodiment, the scale controller discriminates between the second storage carrier and another object. The scale controller initiates a tare command to begin weighing the material in response to receiving a signal representative of an object and ends the tare command to end weighing the material in response to receiving a signal representative of the absence of the object. The object is considered to be the second storage carrier when a tare weight record is greater than a predetermined setpoint value. In an embodiment, presence sensor is one chosen from a photoelectric diffuse, a photoelectric reflector, a photoelectric time of flight, a laser diffuse, a laser reflector, a laser time of flight, a radar, a LIDAR, a ultrasonic time of flight, an ultrasonic diffusing, or an ultrasonic reflector.

Additional subsystems can also be provided. In an embodiment, scale controller is in communication with a position subsystem to receive a position subsystem input representative of a geo-location and associates the weight measurement from the load cell with a geo-location. In an embodiment, scale controller is in communication with an image subsystem to receive an image subsystem input representative of an identification of the second storage carrier and associates the weight measurement from the load cell with the identification of the second storage carrier.

A method for measuring weight of material is also disclosed. The method provides for monitoring with a scale controller in communication with a load cell on a first storage carrier a weight of material in the first storage carrier. The method continues with detecting with a presence sensor a presence of an object. Upon detection, entering a tare mode of the scale controller when the presence sensor provides a signal representative of the presence of the object.

The method continues with defining a beginning weighing for the tare mode followed by an ending the tare mode of the scale controller upon detection of an absence of the object. The method can conclude with determining a tare weight record corresponding to an amount of material unloaded from the first storage carrier.

In an embodiment, the method can include storing in predetermined intervals the weight of material in the first storage carrier in a gross weight memory buffer. The method can also include calculating the starting weight for the tare mode of the scale controller from an average of values stored in the gross weight memory buffer and determining an ending weight of the tear mode of the scale controller from an average of values stored in the gross weight memory buffer and determining tare weight record from a difference between the starting weight and the ending weight. In an embodiment, the method can comprise deleting the tare weight record when the tare weight record is less than a setpoint value and storing and making visible to an operator the tare weight record when the tare weight record is greater than the setpoint value.

The method can comprise the presence sensor providing a binary signal to the scale controller corresponding to the presence and absence of the object and upon receipt of the binary signal corresponding to the presence of the object the scale controller enters the tare mode to begin measuring with the load cell the weight of material expelled from the first storage carrier. The method can include latching the scale controller in the tare mode until the scale controller receives from the presence sensor the binary signal corresponding to the absence of the object.

The method can include recording a geographical location of the first storage carrier following the ending of the tare mode of the scale controller. The method can also include recording an identification of the first storage carrier with an image sensing device following the ending of the tare mode of the scale controller.

DETAILED DESCRIPTION

Figure 4:
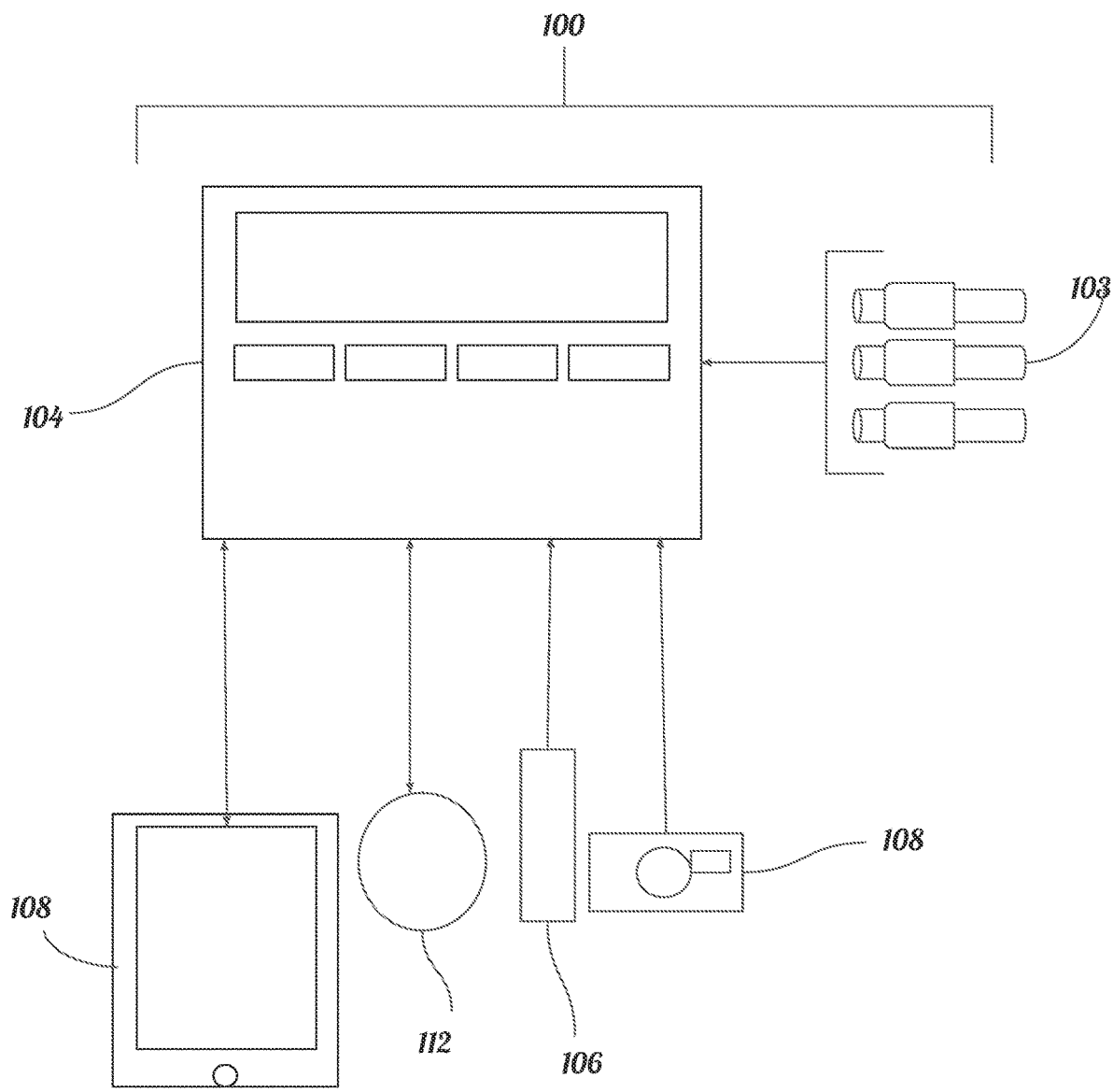
FIG. 4 is a block diagram showing the relationship of the scale controller with the scale controller interface and the various sensors and sensor subsystems according to this disclosure.

FIG. 4 shows a weighing system 100 according to this disclosure. Weighing system 100 generally comprises of at least one load cell 103 in communication with a scale controller 104, which can be in communication with a separate scale interface 110 to provide a remote user interface for an operator 109. Scale controller 104 continuously monitors the weight measured by load cell 103 and is in communication with a presence sensor 106 to measure the presence of another storage carrier. Weighing system 100, as implemented on a storage carrier herein described, provides automatic start/stop control of the weighing functions based on the stability of weight data measured by the load cell 103 and the presence of another storage carrier.

Figure 1:
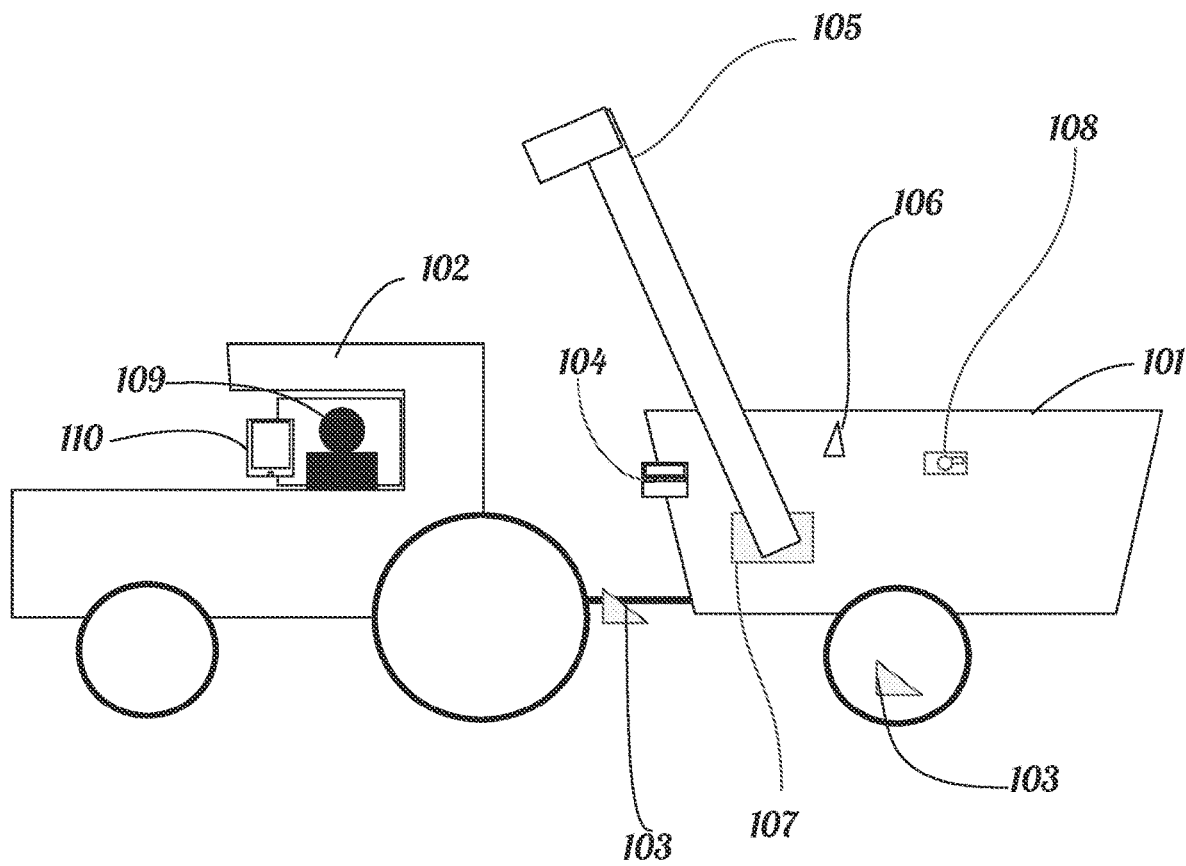
FIG. 1 shows a tractor coupled to a grain cart implementing the methods and systems disclosed herein.
Figure 2:
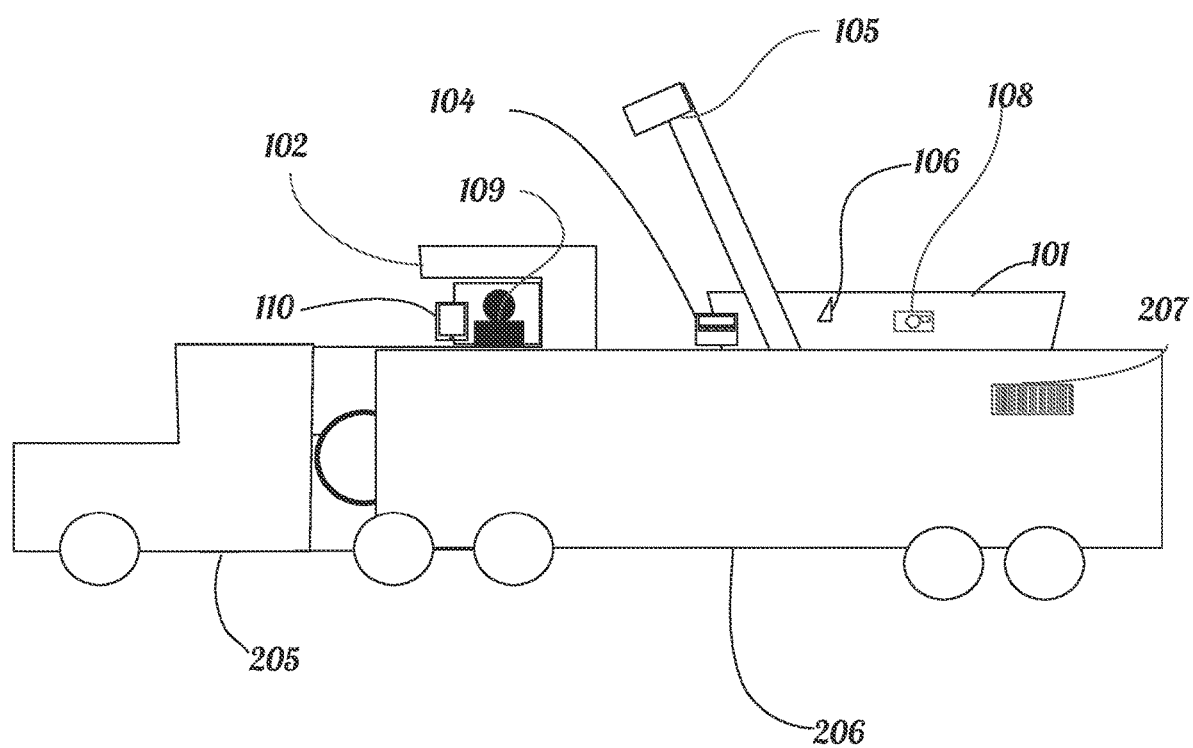
FIG. 2 shows a grain cart unloading material into a semi trailer according to the methods and systems of this disclosure.

In this arrangement, there is a first storage carrier, shown in FIGS. 1 & 2 as a grain cart 101, which presently has material for off loading and a second storage carrier, shown in FIG. 2 as a semi-trailer 206, for receiving the material from grain cart 101. The weight of material, as measured by the load cell 103, can be continuously monitored in grain cart 101 by scale controller 104. Additional sensors can be provided to weighing system 100 to better identify and track grain cart 101, semi-trailer 206, or other storage carriers used for transporting material from the field to the elevator. A positioning subsystem 112 can be in communication with scale controller 104 to log the geo-location of an offloading event. An imaging subsystem 108 can be used to specifically identity grain cart 101, semi trailer 206, or other storage carriers to associate it with an offloading event, either as the offloading storage carrier or the receiving storage carrier.

For purposes of this disclosure, a storage carrier is any machine or container capable of holding a material, including a combine or other material harvester, a mobile hopper, a wagon, a grain cart, etc. Specific types of storage carriers may be referred to hereon out to illustrate the flow of material from the field to a grain elevator. It should be understood, however, that when an embodiment is illustrated and described in the context of a particular type of storage carrier it is equally suitable for another particular type of storage carrier unless specifically stated otherwise. When reference is made to a particular device being combined to any of the foregoing storage carriers, this means anywhere thereon unless a particular location is specifically referenced.

In general, a combine or harvester type storage carrier is used for harvesting grain, beans, or other agricultural material out of a field. The harvester typically has an unloading apparatus, such as an auger, conveyor, vacuum system, etc. to transport or move the grain out of the storage area of the storage carrier. The unloading apparatus can extend to a position relative to the middle of a storage area of another storage carrier, such as shown in FIG. 2 with a grain cart 101 and its unloading apparatus 105 over another storage carrier shown as a semi-trailer 206. It should be understood that there was probably another offloading event from the harvester to grain cart 101 that could be tracked as herein described.

Weighing system 100 can be implemented, as shown in FIG. 1, on grain cart 101. Grain cart 101 can comprise a storage area configured as a hopper with a downward taper to funnel. The opening at the base of the hopper of grain cart 101 is obstructed by a hopper door 107. The hopper door may be mechanically, hydraulically, or electrically actuated. Opening of the hopper door allows for the discharge of the material out of the hopper. Unloading apparatus 105 can be provided to unload the material to another storage carrier, such as a semi-trailer 206 (shown in FIG. 2) for transporting the material to another location. Unloading apparatus 105 can be driven by a PTO shaft which is in turn driven by the engine or other power source of a tractor 102. As material is offloaded or received by a storage carrier, such as grain cart 101, weighing system 100 provides automatic start/stop control of the weighing functions based on the stability of weight data measured by the load cell 103 and the presence of another storage carrier.

Figure 3:
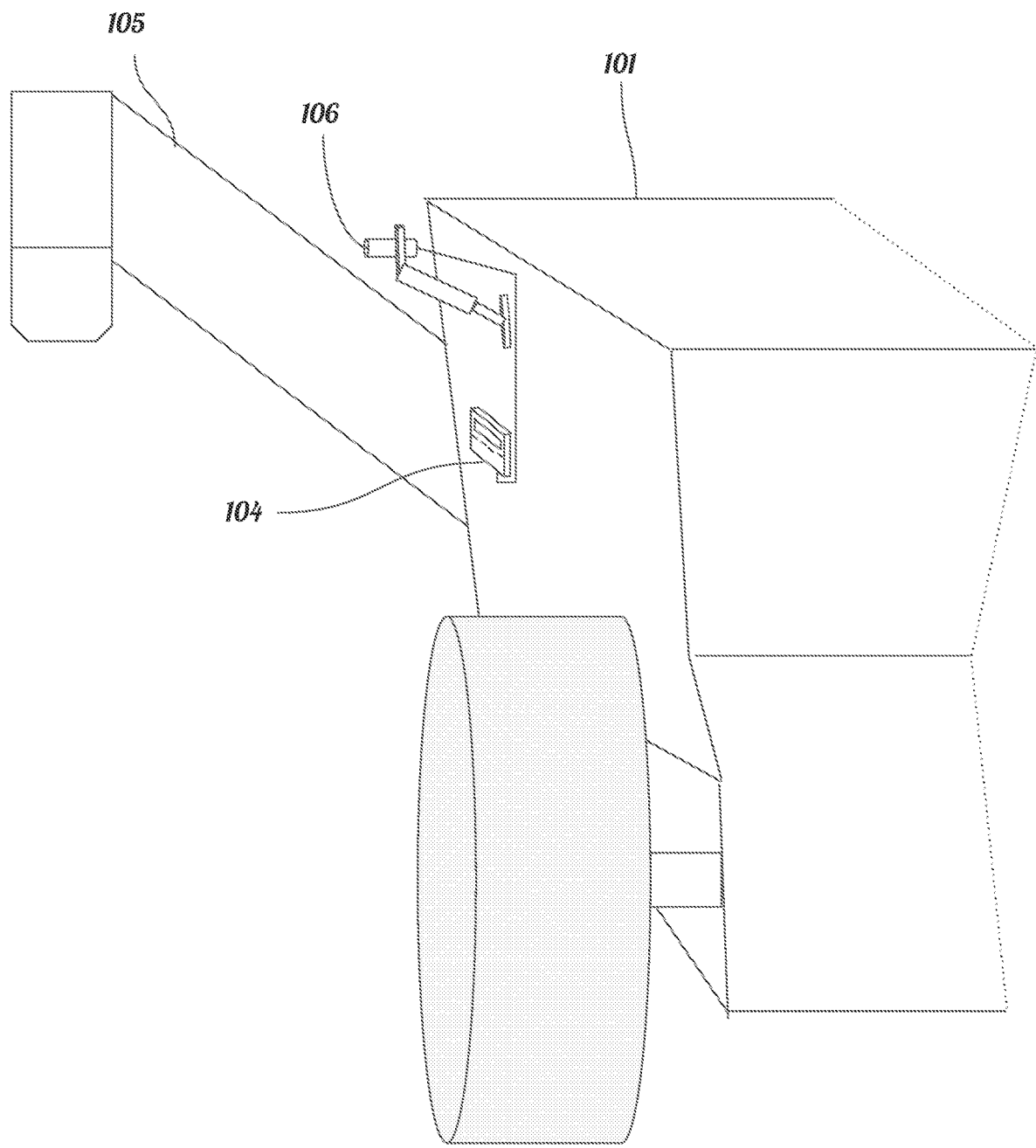
FIG. 3 shows a sensor mounted to the side of a storage carrier for the purpose of detecting the presence of an object, according to the methods and systems of this disclosure.

Turning briefly to FIG. 3, shown is presence sensor 106 attached to the side of the grain cart 101 and directed to detect any object within its designated field of view or operating range next to the grain cart 101. Presence sensor 106 is in direct communication with scale controller 104, which can also be attached to the side of the grain cart 101. Presence sensor 106 detects the presence of any object in its designated field of view or its operating range, including another storage carrier, such as semi-trailer 206 or any other object. There is no discernment by presence sensor 106 of the object whether it is a storage carrier or any other object such as a person, tree, vehicle, etc. There is also no discernment of any weight change to initiate or end the recording sequence or tare mode for scale controller 104. Rather, the start and stop sequence of the tare mode of scale controller 104 is determined by the presence followed by absence of an object detected by presence sensor 106. The presence sensor 106 does not identify or determine what the object is or the operational state of grain cart 101, rather presence sensor 106 only detects that there is an object proximate to grain cart 101. Thus, when a second storage carrier comes within range of presence sensor 106, a signal is sent to scale controller 104, providing notification of the presence of an object. Presence sensor 106 can be implemented as any one of a photoelectric diffuse, photoelectric reflector, photoelectric time of flight, laser time of flight, radar, LIDAR, ultrasonic time of flight, ultrasonic diffusing, or ultrasonic reflector, or the like, as long as it can detect the presence of an object within its designated field of view or operating range. In one implementation, the presence sensor input signal 503 can be a binary signal representing a high/low or latch/unlatch corresponding to the detection of the presence or absence of an object. Presence sensor 106 can have hysteresis control which allows scale controller 104 to derive the binary signal output (on/off) associated with the quality or strength of the signal reflected back to presence sensor 106 from the object. A threshold signal strength can be set for presence sensor 106 so that signal strengths below the threshold value are ignored (or considered as a binary "0"). For example, the hysteresis for the return of a semi-truck trailer, in comparison with a fence post, or corn plant, can be adjusted to eliminate false signal (on/off) from presence sensor 106.

Referring to FIG. 2, shown is an exemplary work flow of offloading material from grain cart 101 to a semi-trailer 206 pulled by a semi-truck 205 for transporting the material away from the field. When presence sensor 106 on grain cart 101 comes within range of semi-trailer 206 its presence is detected and scale controller 104 will begin its workflow, as described below in reference to FIG. 6, to determine the weight of the material unloaded from grain cart 101 into semi-trailer 206.

Scale interface 109 can also be in communication with scale controller 104. Scale controller 104 and scale interface 109 can be integrated as a single device. Scale controller 104 can have its own display for providing limited information to operator 110. Scale controller 104 can be in the cab of tractor 102 or can be attached to the side of grain cart 101, as shown in FIGS. 1-3. Alternatively, scale interface 109 implemented as a stand alone device or as a mobile device with an appropriate application running thereon can be provided and communicatively coupled to scale controller 104. Scale interface 109 can be carried by operator 109 for real time viewing of the data on scale controller 104 inside the cab of tractor 102 or wherever operator 109 is standing.

Turning to FIG. 4, other subsystems can be combined to scale controller 104 to identify storage carriers. Scale controller 104 can be in communication with imaging subsystem 108 which can be used to identify a second storage container or provide a stored image for recall for verification of weight record data and traceability of material in grain cart 101. Identification, for example, can be carried out by an object recognition system or by detection of image label 207 affixed to the side of a storage carrier, such as grain cart 101 or semi-trailer 206. Image label 207 may be a bar or QR code, a symbol, lettering, color, or the like, and imaging subsystem 108 can capture an image of such image label 207 and translate it to an alpha-numeric code and match the code with the code stored in the database and associated with a particular storage carrier. This way, a weight record obtained by scale controller 104 can be associated in the database with the particular storage carrier.

Scale controller 104 can also be coupled to a positioning subsystem 112, such as a global positioning system (GPS), which is used to report a geographical location of the material transfer event. A location is tagged by scale controller 104 which is in continuous electronic communication with positioning subsystem 112. When a material weight record is determined, scale controller 104 can request the current geographic location, parses the geographic location received from positioning subsystem 112 as a latitude and longitude, and associates the geographic location with the material weight record. This way information about where grain cart 101 is located and how much material it receives at that particular location can be stored. Grain cart 101 can then be tracked to its unloading geolocation and the amount of material unloaded at that location can be tracked and stored. This allows producers to track the material from location to location through a chain of events from the field to the final destination.

In an embodiment, when the gross weight of grain cart 101 drops below a predetermined setpoint, the location of grain cart 101 can be cleared. When, however, the gross weight meets or exceeds the setpoint value, the location can be tagged by scale controller 104 as an origin location. Then, when grain cart 101 is unloaded, this origin location can be associated with the material weight record, as discussed in more detail below in connection with FIG. 6.

Figure 5:
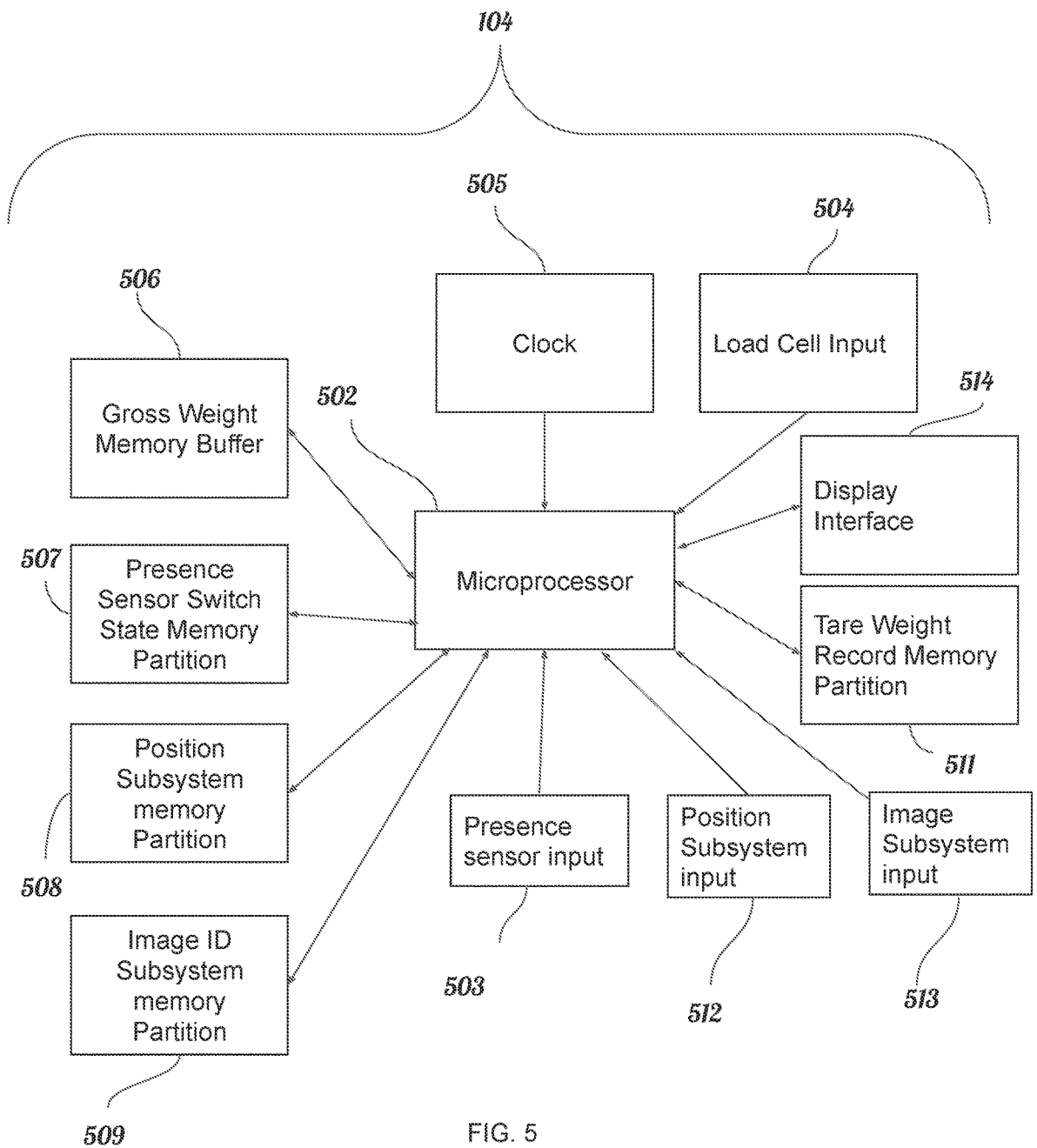
FIG. 5 is a block diagram of the scale controller, according to this disclosure.

Referring to FIG. 5, shown is a block diagram of scale controller 104. Scale controller 104 comprises of a microprocessor 502 that receives load cell input signal 504 (either analog or digital) from load cell 103 which it uses to determine the weight of the material being transferred. A clock signal 505 from a clock chip (either in or separate from microprocessor 502) provides a periodic signal to microprocessor 502 so that at regular intervals microprocessor 502 records the gross weight received as load cell input signal 504 from load cell 103. The gross weight is then temporarily stored in a buffer referred to as a gross weight memory buffer 506.

The weight values stored in gross weight memory buffer 506 are used to determine the starting weight for the tare mode of scale controller 104. When microprocessor 502 receives from presence sensor 106 a presence sensor input signal 503 representing the presence of an object, the starting weight record is determined. This presence sensor input signal 503 can be a binary signal representing a high/low or latch/unlatch corresponding to the detection of the presence or absence of an object. Scale controller 104 then enters a tare mode with this starting weight. The tare mode ends when the absence of the object is detected. When the weight measured by load cell 103 and provided to microprocessor 502 as load cell input 502 exceeds a setpoint value, this weight record is referred to as a weight transfer record and is permanently stored in a tare weight record memory partition 511 where it is visually displayed on display interface 514. This is indicative of weighing system 100 determining and recording a material transfer event. This process will be more specifically described in connection with FIGS. 6-9, below.

Microprocessor 502 also receives position subsystem input 512 from positioning subsystem 112. When microprocessor 502 determines a material transfer even occurred, as described above, microprocessor 502 stores location data corresponding to position subsystem input 512 in position subsystem memory partition 508 where it is associated with the weight transfer record stored in tare weight record memory partition 511.

Microprocessor 502 also receives image subsystem input 513 from imaging subsystem 108. When microprocessor 502 determines a material transfer even occurred, as described above, microprocessor stores the record associated with the particular storage carrier receiving the material in the transfer event in image subsystem memory partition 509 where it is associated with weight transfer record stored in tare weight record memory partition 511.

The process implemented by weighing system 100 will now be more specifically described in connection with flow charts for the various implementations. It should be understood that the processes herein described are carried out by microprocessor 502 residing in scale controller 104.

Figure 6:
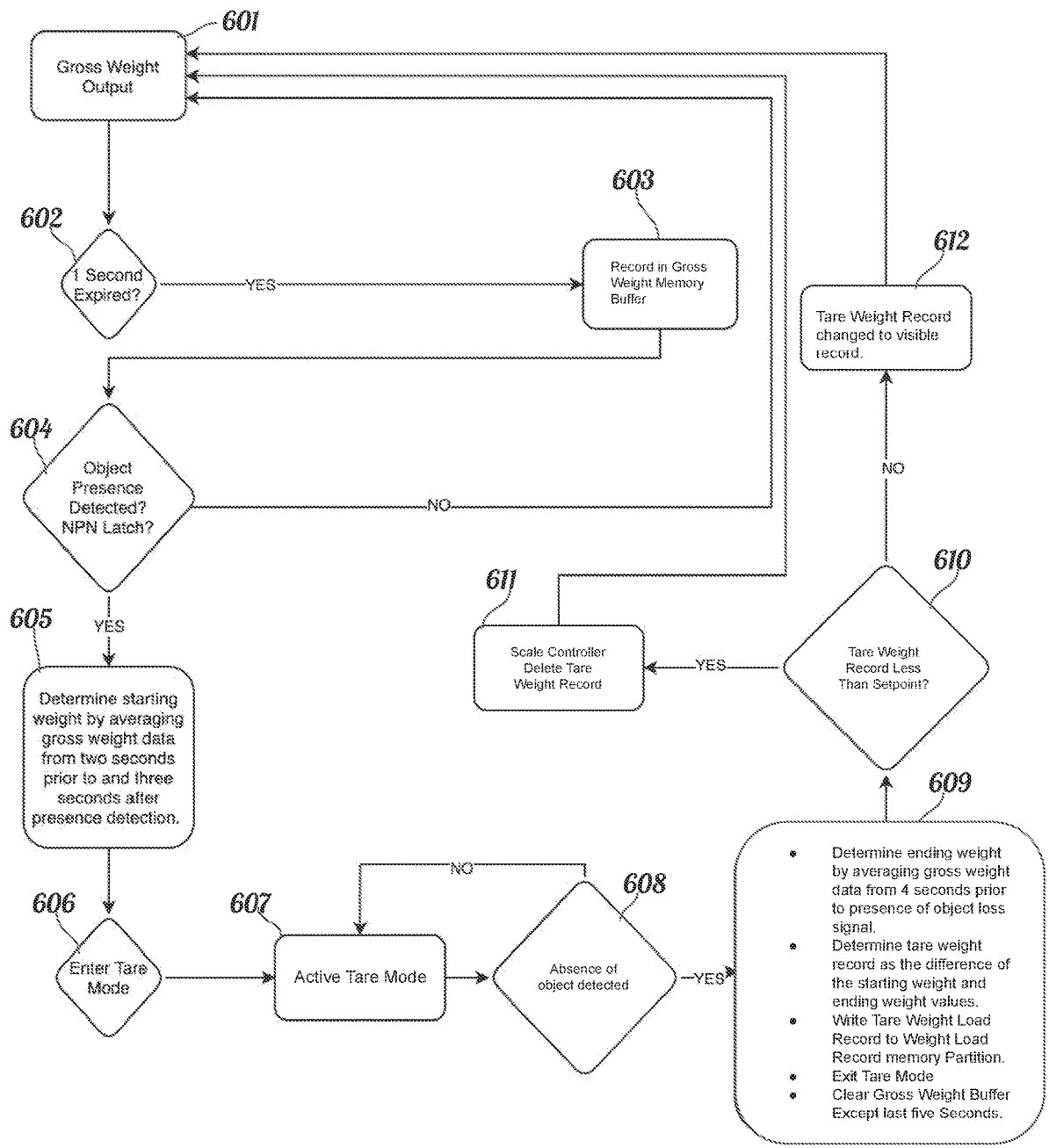
FIG. 6 is a flow chart showing a method for deriving a weight record.

Referring to FIG. 6, shown is a method for deriving a weight record. At the start of the step 601, scale controller 104 and presence sensor 106 are in an idle state. Scale controller 104 monitors load cell 103, and at one second intervals of a clock 602, records the gross weight of grain cart 101 in a revolving buffer referred to as gross weight memory buffer 506. If at step 604 an object is not detected, the process of capturing and storing the gross weight in one second intervals in gross weight memory buffer 603 is continued.

If at step 604, however, an object's presence is detected, the starting weight for the tare mode is determined by averaging all the gross weight readings stored in gross weight memory buffer 603. The average is derived from weight samples collected two seconds prior to the object presence detection, through three seconds after the object presence detection. After the average is determined, scale controller 104 initiates a tare mode 606 and displays a temporary zero on the display for scale controller 104.

As operator 109 of grain cart 101 begins the process of energizing the PTO drive system and opening the gate of grain cart 101, material inside grain cart 101 will start to offload into semi-trailer 206. This will be reflected as a decreasing weight on the display for scale controller 104 in an active tare mode 607.

Active tare mode 607 will remain in this state until the absence of the object is detected at step 608. When the object's absence is detected or the object is lost, a second signal of presence sensor 106 is communicated to scale controller 104. At this point, a series of processes occur at step 609.

The ending tare weight record is calculated by averaging the values in gross weight memory buffer 603 before the absence of the object is detected and subtracting the starting weight determined in step 605 from this ending weight. This ending tare weight record is stored by writing this ending tare weight record to tare weight record memory partition 511. Scale controller 104 exits tare mode. The values in gross weight memory buffer 506 are cleared. While specific time periods are given; for example, averaging occurs for the previous four (4) seconds for readings but any value of readings can be used. One skilled in the art will understand that any time frame or size of a buffer can be given or used, i.e. the average time frames used above can be extended or shortened.

At step 610, scale controller 104 evaluates the tare weight record determined at step 609 as being above or below an operator defined setpoint. If the tare weight record is below the setpoint, scale controller 104 deletes the tare weight record at step 611 and returns to step 601 to record one second intervals of capturing the gross weight reading in the gross weight memory buffer 603. If the tare weight record is above the setpoint, at step 612 the tare weight record is marked as visible, which is weight transfer record stored in tare weight record memory partition 511 of FIG. 5 is displayed and stored. The process then returns to step 601 to record one second intervals of capturing the gross weight reading in the gross weight memory buffer 506 at step 603.

Figure 6A:
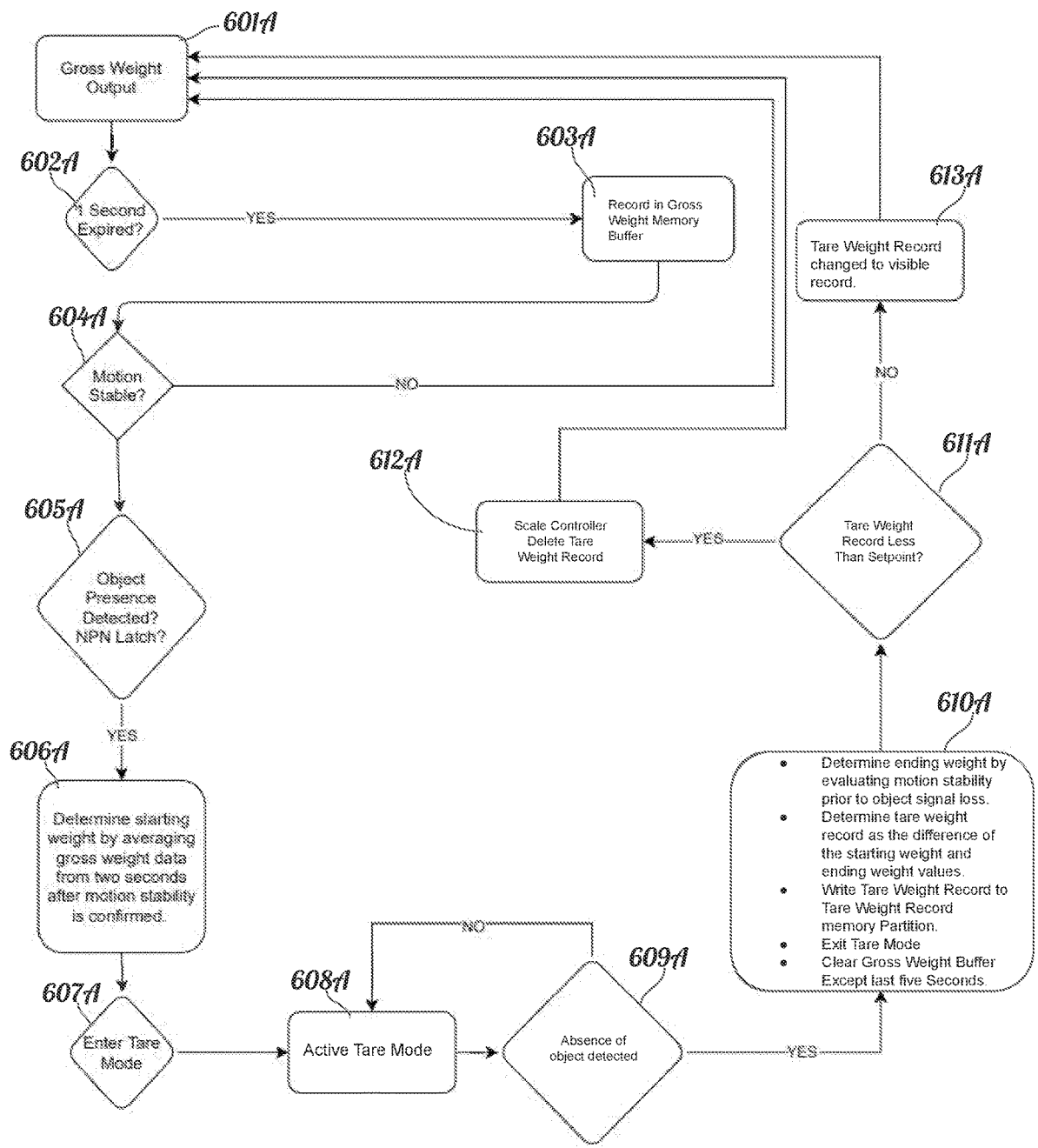
FIG. 6A is the flow chart of FIG. 6 with additional methods for motion stability.

Referring to FIG. 6A, shown is a method for deriving a weight record with stability control. At the start of the step 601A, scale controller 104 and presence sensor 106 are in an idle state. Scale controller 104 monitors load cell 103, and at one second intervals of at step 602A, records the gross weight of grain cart 101 in a revolving buffer referred to as gross weight memory buffer 506. If at step 604A an object is not detected, the process of capturing and storing the gross weight in one second intervals in gross weight memory buffer 603A is continued. These steps are the same as described above with reference to FIG. 6.

A motion state is derived from the observed display count on scale interface 110 of scale controller 104 multiplied by a factor over a given time period. For example, if the display count on scale interface 110 is changed by a factor of two for over two seconds, the scale display on scale interface 110 provides a mode of operation called motion and recognition of an unstable weight. If the motion is stable at step 604A, scale controller 104 allows for presence sensor 106 to be acknowledged. If load cell 103 is not stable, scale interface 110 maintains the motion state and continues to record in one second intervals at step 601A the gross weight memory buffer 506 at step 603A. Any objects detected by presence sensor 106 are ignored until the motion is stable at step 604A, which also means scale controller 104 will not enter a tare mode.

After motion is stable at step 604A and if an object's presence is detected at step 605A, the starting weight is determined by averaging the gross weight readings stored in the gross weight memory buffer 506 at step 603A. The average is derived from weight samples collected two seconds after the object presence detection at step 606A. After the average is determined, scale interface 110 begins a tare mode 607A, displaying a temporary zero on the display for scale controller 104.

Once tare mode is initiated at step 607A, gross weight memory buffer 506 at step 603A is still storing values in an active tare mode 608A even as unloading of the material ends and the absence of the object is detected at step 609A. At step 610A, the ending weight is determined by evaluating motion stability prior to the absence of the object being detected at step 609A. The ending weight is derived from the last stable weight, which is derived from gross weight memory buffer 506 in reverse time up to 20 seconds prior to the absence of the object being detected in step 609A utilizing the same method of weight stability, whereas the last gross weight count of two increments within the gross weight buffer did not exceed two seconds closest in time from the loss of absence of the object. The weight record within the gross weight memory buffer 506 that represents the stability requirement is then utilized as the ending weight of the tare mode. If the weight stability cannot be derived, the gross weight recorded in the gross weight memory buffer 506 at the time when the absence of object was detected is utilized as the ending weight of the tare mode.

The tare weight is then determined by subtracting the starting weight determined at step 606A from the ending weight determined at step 610A and recorded in tare weight record memory partition 511. Scale controller 104 exits tare mode and gross weigh memory partition 506 is cleared. If the tare weight record is below the setpoint, scale controller 104 deletes the tare weight record at step 612A and returns to step 601A to record one second intervals of capturing the gross weight reading in gross weigh memory partition 506 at step 603A. If the tare weight record is above the setpoint, at step 613A the tare weight record is marked as visible that is weight transfer record stored in tare weight record memory partition 511 of FIG. 5 is displayed and stored. The process then returns to step 601A to record one second intervals of capturing the gross weight reading in the gross weight memory buffer 506 at step 603.

Figure 7:
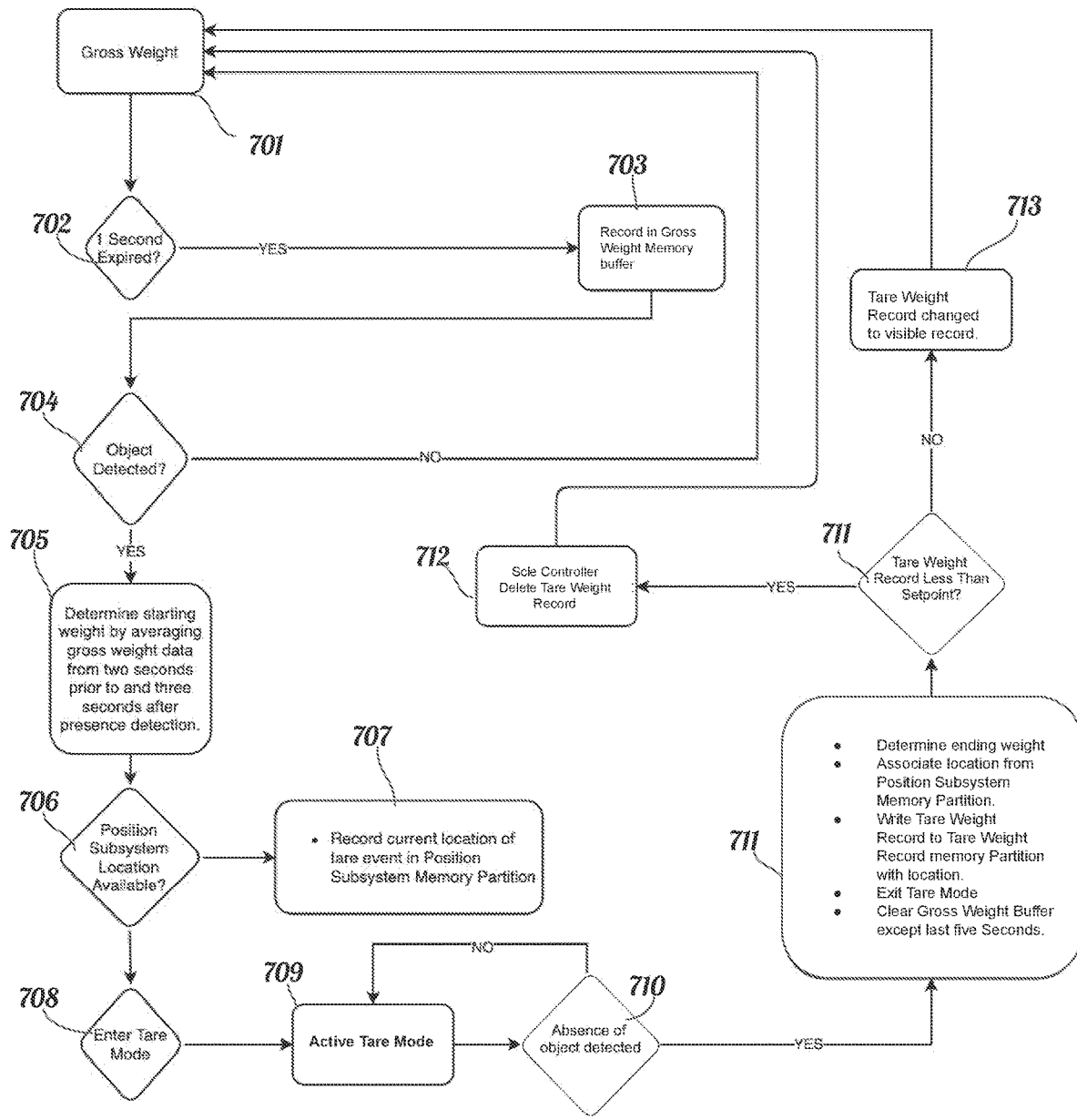
FIG. 7 is a flow chart of the process for appending the location data to the weight record according to this disclosure.

Referring to FIG. 7, shown is a method to derive a weight record with geo-positional recording. The method begins at step 701 as described in FIG. 6. After the average weight is determined at step 705, scale controller 104 communicates to the positioning subsystem 112. If positioning subsystem 112 is within communication and a location is available at step 706 to poll from positioning subsystem 112, scale controller 104 will record the current location of grain cart 101 within the positional subsystem memory partition 508 of scale controller 104 at step 707. If no positioning subsystem 112 is present, no record of location will be created. The rest of the method continues, as described above in reference to FIG. 6.

Figure 8:
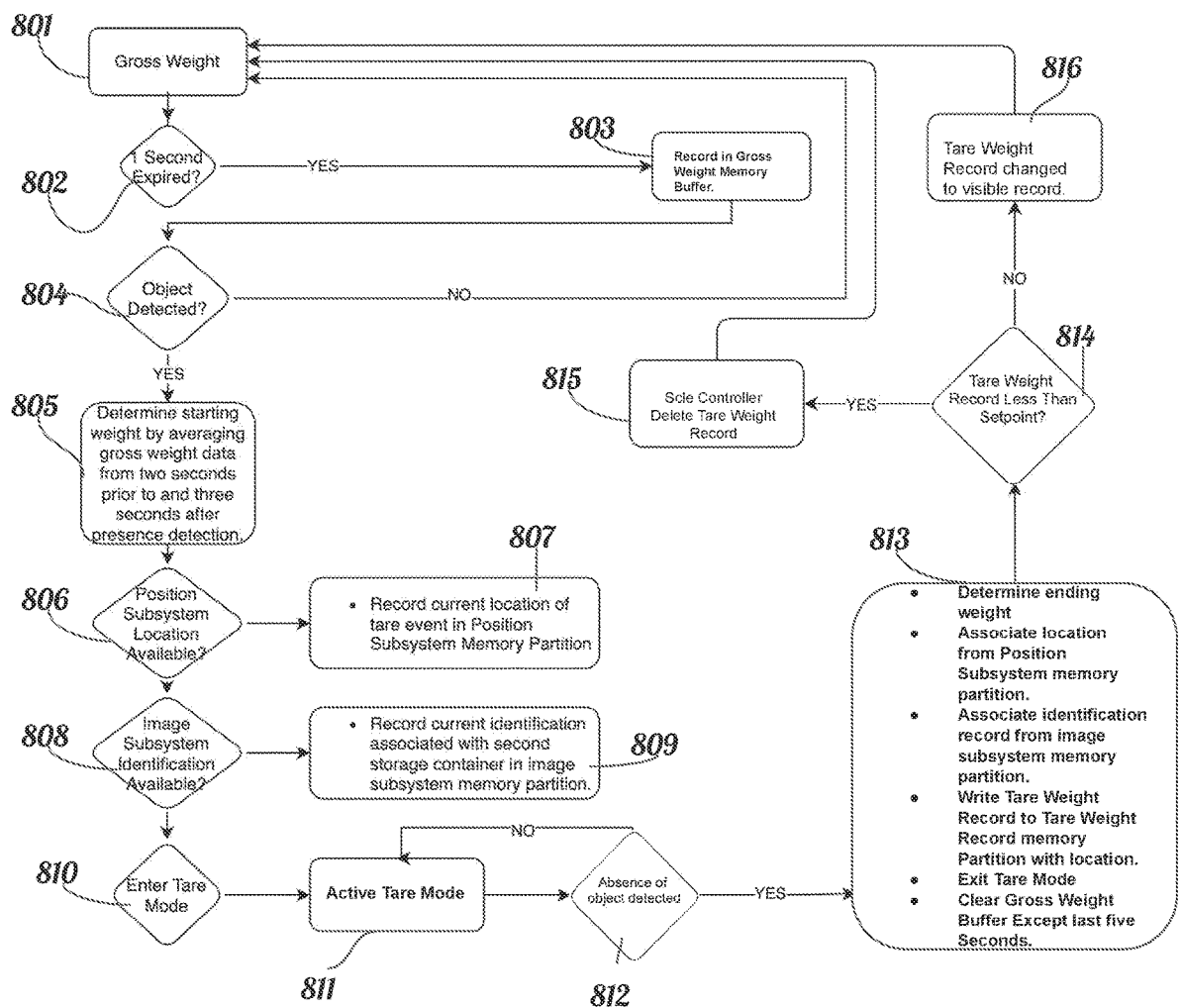
FIG. 8 is a flow chart of the process for acquiring the location data and image identification data of a secondary storage carrier and appending the data to a weight record.

Referring to FIG. 8, shown is a method to derive a weight record with geo-positional recording and identification of a second storage carrier. The method begins at step 801 as described in FIG. 6. The method continues with the recording the current location of grain cart 101 within the positional subsystem memory partition 508 of scale controller 104 at step 807, in the manner described above in reference to FIG. 7. The method continues at step 808 by scale controller 104 polling imaging subsystem 108 at step 808 for an identification of the second storage carrier and if an identification is available scale controller 104 will record its identification at step 809 within image subsystem memory partition 509. The rest of the method continues, as described above in reference to FIG. 6.

One skilled in the art will recognize that the methods described in FIG. 6, FIG. 6A, FIG. 7, and FIG. 8 can be combined and reorganized in various manners. For example, the motion stability of FIG. 6A can be combined with the geolocation recording of FIG. 7 or the storage carrier identification of FIG. 8. Any combination of one or more of the foregoing can also be combined with the method described in FIG. 6.

Figure 9:
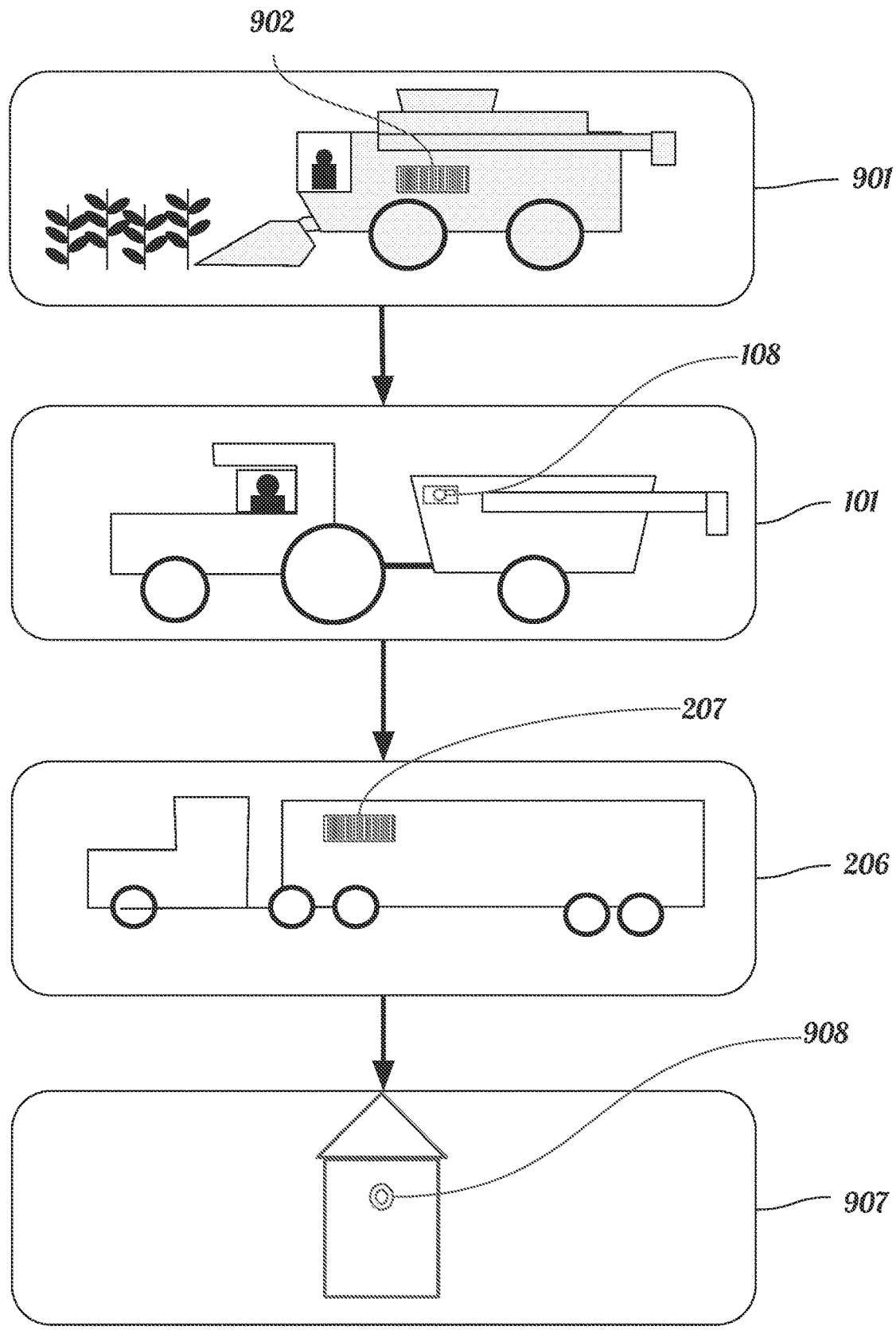
FIG. 9 is a drawing depicting an embodiment of the implementation of the material traceability system.

Referring to FIG. 9, shown is an exemplary diagram of the traceability of the origin of material through the destination of the material. Affixed to the side of a combine harvester 901 is a barcode symbol 902 easily viewable from a distance. The combine harvester gathers grain material in the field and offloads periodically into a grain cart 101. The combine harvester barcode symbol 902 identification is registered in a remote database for which scale controller 104 located on the grain cart 101 is in communication. When the grain cart 101 receives a material transfer in the field from the combine harvester 901, image subsystem 108 captures the identification of the combine harvester 901 and communicates the identification of the combine harvester 901 to the scale controller 104. The scale controller 104 further records the combine harvester 901 identification in image subsystem memory 509 and retains the record until a weight transfer transaction is accomplished by the grain cart 101 into a semi truck trailer 905.

Scale controller 104 of the grain cart 101 is in communication with positioning subsystem 112 and records a location of the transfer from the combine harvester 901 into the grain cart 101. This location is stored in positional subsystem memory partition 508 of scale controller 104. This location is associated with the weight transfer record stored in tare weight record memory partition 511.

Affixed to the semi trailer 206 is a barcode symbol 207 easily viewable from a distance. The barcode symbol 207 is registered in a remote database that is in communication with scale controller 104. When the semi truck trailer 207 receives a material transfer from the grain cart 101 in the field, the imaging subsystem 108 on the grain cart 101 captures the barcode symbol 207 on the semi truck trailer

206 and communicates the identification from barcode symbol 906 to scale controller 104. The scale controller 104 also records the identification from the barcode symbol 207 in the image subsystem memory 509 of microprocessor 502 in scale controller 104.

Once the material transfer is completed from the grain cart 101 to the semi truck trailer 206, the record of weight transaction is created in the scale controller 104 of the grain cart 101 and further transmitted to a remote server with the associated locations, identifications, and weight record of the material traceability record. The server marks the transaction as incomplete, as the associated weight record transaction ID with the semi truck trailer 206 does not provide a destination identification 907. As the semi-truck trailer 206 arrives at the destination 907, a camera subsystem 908 in the presence of the destination 907 within communication of the remote server identifies the semi truck trailer 206 and communicates the identification to the remote server. The remote server identifies the semi truck trailer 206 with the associated weight transaction marked as incomplete and records the destination to the weight traceability record, marking it complete.

Figure 10:
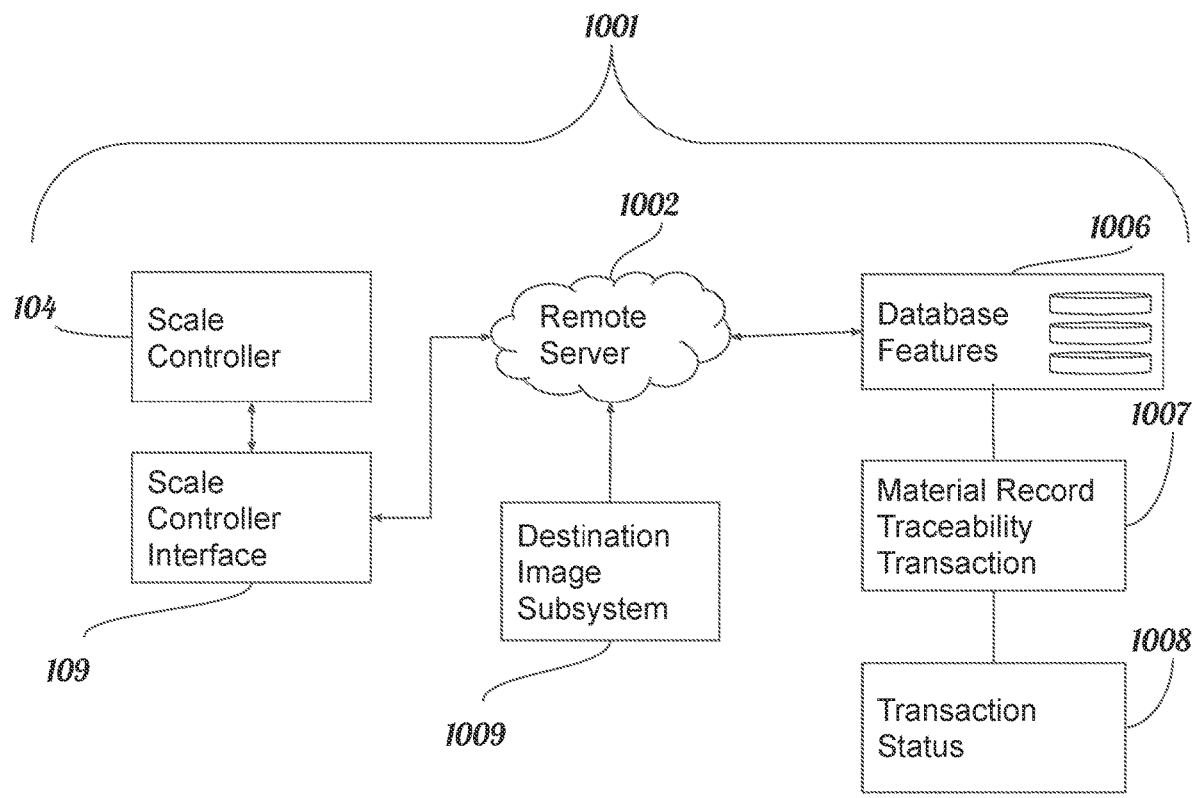
FIG. 10 is a block diagram of the system for traceability of the material origin through material destination.

Referring to FIG. 10, shown is a block diagram of the traceability of the material transfer 1001 by uploading information described above into a remote server 1002. Scale controller 104 is in further communication with scale interface 109 which is implemented as an internet enabled device to communicate with remote server 1002. Tare weight records, geolocation data, and image data obtained by the processes described above can be communicated from scale controller 104 to scale interface 109, as described above, and uploaded to database 1006 accessible via remote server 1002. A destination image capture sub-system 1009 at the destination can capture an offloading event and associate the image with the weight record to establish a chain of custody from the field to the final location.

More specifically, the image identification is commonly associated with a secondary or third storage carrier that is pre-registered within a database feature 1006 of remote server 1002. When scale controller 104 completes a material transfer from grain cart 101 to semi trailer 206, for example, the identification of the image obtained by the processed described above is communicated to remote server 1002 and stored as an incomplete material traceability record 1007 in a database 1006 as there is no arrival event recorded to the destination to mark a transaction status record 1008 as complete. As semi trailer 206, for example, container arrives at a destination, image subsystem 1009 mounted in the proximity of the destination, identifies semi trailer 206 and identifies the incomplete record associated with semi trailer 206 and marks the record as complete with transaction status 1008.

One or more components of the systems and methods for measuring the weight of material can comprise any collection of processor-based devices or computing devices operating together, or components of processing systems or devices, as is known in the art. Microprocessor 502 of scale controller 104, as shown in FIG. 5, can include, for example, to any logic processing unit, such as one or more central processing units (CPUs), digital signal processors (DSPs), application-specific integrated circuits (ASIC), microcontroller, etc. These can be implemented in any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The processor and memory in microprocessor 502 can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods of weighing material can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages. These communication paths can connect, for example, scale controller 104 and presence sensor 106 and mobile device.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system for measuring a weight of material that is transferred from a first storage carrier to a second storage carrier, the system comprising:
    a presence sensor combined to the first storage carrier for detecting a presence of the second storage carrier;
    a load cell for measuring the weight of the material expelled from the first storage carrier; and
    a scale controller in communication with the presence sensor for responding to the presence of the second storage carrier by entering a tare mode to begin measuring with the load cell the weight of material expelled from the first storage carrier, and thereafter, recording of the weight measurement from the load cell.

2. The system of claim 1, wherein the scale controller further comprises of a gross weight memory buffer for storing at predetermined intervals a weight measured by the load cell.

3. The system of claim 2, wherein the presence sensor detects the presence of the second storage carrier proximate to the first storage carrier and, in response to the detection of the presence of the second storage carrier, the scale controller determines a starting weight by averaging the weight measured by the load cell stored in the gross weight memory buffer for a period of time before and another period of time after the detection of the presence of the second storage carrier.

4. The system of claim 3, wherein the presence sensor provides a binary signal to the scale controller corresponding to the presence and absence of the second storage carrier and upon receipt of the binary signal corresponding to the presence of the second storage carrier the scale controller enters the tare mode to begin measuring with the load cell the weight of material expelled from the first storage carrier and stays in the tare mode until the scale controller receives from the presence sensor the binary signal corresponding to the absence of the second storage carrier.

5. The system of claim 4, wherein the scale controller determines an ending weight in response to an absence of the second storage carrier detected by the presence sensor and a tare weight record is determined from subtracting the starting weight from the ending weight.

6. The system of claim 5, wherein the tare weight record is compared to a predetermined set point, and wherein if the tare weight record is less than the predetermined set point the tare weight record is omitted, and wherein if the tare weight record is greater than the predetermined set point the tare weight record is saved.

7. The system of claim 5, wherein the ending weight is determined by averaging the weight measured by the load cell stored in the gross weight memory buffer for a period of time before and another period of time after the absence of the second storage carrier is detected by the presence sensor.

8. The system of claim 1, wherein the scale controller is in communication with the presence sensor, wherein the scale controller receives from the presence sensor a presence signal representative of the presence of an object, wherein in response to the presence of the object the scale controller determines a beginning weight of the material, and wherein the scale controller receives from the presence sensor a second signal representative of the absence of the object, and wherein in response to the absence of the object the scale controller records an ending weight of the material.

9. The system of claim 8, wherein the scale controller initiates a tare command to begin weighing the material in response to receiving the first signal, and wherein the scale controller ends the tare command to end weighing the material in response to receiving the second signal, and wherein the object is considered to be the second storage carrier when a difference in weight is greater than a predetermined setpoint value.

10. The system of claim 1, wherein the presence sensor is one chosen from a photoelectric diffuse, a photoelectric reflector, a photoelectric time of flight, a laser diffuse, a laser reflector, a laser time of flight, a radar, a LIDAR, a ultrasonic time of flight, an ultrasonic diffusing, or an ultrasonic reflector.

11. The system of claim 1, wherein the scale controller is in communication with a position subsystem to receive a position subsystem input representative of a geo-location and associates the weight measurement from the load cell with a geo-location.

12. The system of claim 11, wherein the scale controller is in communication with an image subsystem to receive an image subsystem input representative of an identification of the second storage carrier and associates the weight measurement from the load cell with the identification of the second storage carrier.

13. A method for measuring weight of material, the method comprising: monitoring with a scale controller in communication with a load cell on a first
    storage carrier a weight of material in the first storage carrier;
    detecting with a presence sensor a presence of an object;
    entering a tare mode of the scale controller when the presence sensor detects the object;
    and
    determining a tare weight record corresponding to an amount of material unloaded from the first storage carrier.

14. The method of claim 13, and further comprising deleting the tare weight record when the tare weight record is less than a setpoint value and storing and making visible to an operator the tare weight record when the tare weight record is greater than the setpoint value.

15. The method of claim 13, storing in predetermined intervals the weight of material in the first storage carrier in a gross weight memory buffer.

16. The method of claim 15, determining a starting weight for the tare mode of the scale controller from an average of values stored in the gross weight memory buffer, and determining an ending weight of the tare mode of the scale controller from an average of values stored in the gross weight memory buffer, and determining tare weight record from a difference between the starting weight and the ending weight.

17. The method of claim 13, wherein the presence sensor provides a binary signal to the scale controller corresponding to the presence and absence of the object and upon receipt of the binary signal corresponding to the presence of the object the scale controller enters the tare mode to begin measuring with the load cell the weight of material expelled from the first storage carrier, and further comprising latching the scale controller in the tare mode until the scale controller receives from the presence sensor the binary signal corresponding to the absence of the object.

18. The method of claim 13, and further comprising:
defining a beginning weighing for the tare mode; and
ending the tare mode of the scale controller upon detection of an absence of the object.

19. The method of claim 18, and further comprising recording a geographical location of the first storage carrier following the ending of the tare mode of the scale controller.

20. The method of claim 18, and further comprising recording an identification of the first storage carrier with an image sensing device following the ending of the tare mode of the scale controller.

\* \* \* \* \*